United States Patent
Chen et al.

(10) Patent No.: US 8,120,284 B2
(45) Date of Patent: Feb. 21, 2012

(54) LIGHT EMITTING DIODE DRIVING DEVICE AND METHOD THEREOF

(75) Inventors: Chien-Yang Chen, Taipei (TW); Chi-Hsiu Lin, Yunlin County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 435 days.

(21) Appl. No.: 12/534,858

(22) Filed: Aug. 4, 2009

(65) Prior Publication Data

US 2010/0283411 A1  Nov. 11, 2010

(30) Foreign Application Priority Data

May 8, 2009  (TW) ............................... 98115412 A

(51) Int. Cl.
*H05B 41/36* (2006.01)
(52) U.S. Cl. ................... 315/307; 315/185 R
(58) Field of Classification Search .......... 315/246, 315/250, 291, 294, 297, 307, 308, 185 R
See application file for complete search history.

(56) References Cited

U.S. PATENT DOCUMENTS

| 7,550,934 | B1 * | 6/2009 | Deng et al. ............ 315/308 |
| 2008/0116818 | A1 * | 5/2008 | Shteynberg et al. ...... 315/192 |
| 2009/0237004 | A1 * | 9/2009 | Ploquin et al. .......... 315/294 |
| 2010/0019681 | A1 * | 1/2010 | Deixler et al. ........ 315/185 R |
| 2011/0018450 | A1 * | 1/2011 | Hsu et al. ............. 315/185 R |
| 2011/0037410 | A1 * | 2/2011 | Hsu et al. ............. 315/294 |
| 2011/0043138 | A1 * | 2/2011 | Hsu et al. ............. 315/297 |
| 2011/0089858 | A1 * | 4/2011 | Wang et al. ........... 315/294 |
| 2011/0204802 | A1 * | 8/2011 | Welten ................. 315/193 |

FOREIGN PATENT DOCUMENTS

| TW | I255376 | 5/2006 |
| TW | 200737070 | 10/2007 |
| TW | M335624 | 7/2008 |

* cited by examiner

*Primary Examiner* — Don Le
(74) *Attorney, Agent, or Firm* — Jianq Chyun IP Office

(57) ABSTRACT

A light emitting diode (LED) driving device and an LED driving method thereof are provided. The LED driving device includes a voltage generator, a circuit and a compensation circuit. The voltage generator is used to provide a positive voltage and a negative voltage, and the circuit is coupled to the positive voltage and the negative voltage. Herein, the circuit includes a load and an LED which are coupled to each other in series. The compensation circuit is used to sense voltages of two ends of the load, so as to generate a compensation signal and adjust the positive voltage and the negative voltage through the compensation signal. Therefore, voltage stress of the LED driving device is reduced by using the provided positive voltage and the provided negative voltage.

12 Claims, 3 Drawing Sheets

LIGHT EMITTING DIODE DRIVING DEVICE AND METHOD THEREOF

CROSS-REFERENCE TO RELATED APPLICATION

This application claims the priority benefit of Taiwan application serial no. 98115412, filed on May 8, 2009. The entirety of the above-mentioned patent application is hereby incorporated by reference herein and made a part of specification.

BACKGROUND OF THE INVENTION

1. Field of the Invention

The present invention relates to a backlight driving technology, and particularly to an LED driving device and an LED driving method thereof.

2. Description of Related Art

For a flat panel display, it includes a liquid crystal displays (LCD), a field emission displays (FED), an organic light emitting diode (OLED), and a plasma display panel (PDP) in this field. Wherein, the LCD is widely adopted and has become a main stream of displays on the market due to its advantages of low operation voltage, radiation free, and so forth.

Generally, the LCD includes a liquid crystal display panel (LCD panel) and a light emitting diode (LED) driving device. LCDs are classified into a transmissive LCD and a reflective LCD. In the transmissive LCD, the back light source is provided by LEDs in back of the LCD panel, and the frames are viewed at the other of the LCD panel. Specifically, since the LCD panel does not emit light, the LEDs driven by the LED driving device are disposed in back of the LCD panel to provide the back light source required by the transmissive LCD. By providing the back light source, the back light passing through the LCD panel is polarized, so that colors displayed in the LCD panel are sensed by human eyes.

This kind of the LCD is usually applied to a display requiring high brightness, such as a desktop display, a personal digital assistant (PDA), and a mobile phone. However, with the development of LCD panel having large size, power consumption of the LED driving device used to the display requiring high brightness is more and more, and when the LED driving device is driven by high voltage, safety issue occurs due to voltage stress of the LED driving device. In order to better describe the issue due to the LED driving device, it is described with reference to a related figure in following.

FIG. 1 shows a conventional LED driving device. Referring to FIG. 1, the LED driving device 100 includes a voltage generator 110, a resistor 120, and an LED series 130, wherein the LED series 130 includes a plurality of LEDs coupled in series. When the LED driving device 100 is operated, the voltage generator 110 receives an input voltage, converts the input voltage to a DC voltage $V_x$, and outputs the DC voltage $V_x$ from an end V11, so that the DC voltage $V_x$ outputted from the end V11 is received by the LED series 130. The LED series 130 has an operating voltage $V_{\mathit{eff1}}$, and the operating voltage $V_{\mathit{eff1}}$ is a voltage difference between the end V11 and an end V12. The LED series 130 is coupled to one end of the resistor 120 through the end V12, and the other end of the resistor 120 is electrically connected to a ground GND.

Referring to FIG. 1, the voltage generator 110, the resistor 120, the LED series 130, and the ground GND form a current path. Accordingly, when the size of the LCD panel increases, the number of the LEDs in the LED series 130 increases with the size of the LCD panel, so that the operating voltage $V_{\mathit{eff1}}$ of the LED series 130 also increases. In other words, relatively high voltage stress for the voltage generator 110 is generated, and safety issue occurs due to the voltage stress.

FIG. 2 shows another LED driving device for saving the issue of the voltage stress. Referring to FIG. 2, the LED driving device 200 includes a voltage generator 210, a resistor 220, and an LED parallel set 230, wherein the LED parallel set 230 includes a plurality of LED series 231 and 232 coupled in parallel. Wherein, when the LED driving device 200 is operated, the voltage generator 210 receives an input voltage and converts the input voltage to a DC voltage $V_x$, so that the DC voltage $V_x$ outputted from the end V21 is received by the LED parallel set 230. The LED parallel set 230 has an operating voltage $V_{\mathit{eff2}}$, and the operating voltage $V_{\mathit{eff2}}$ is a voltage difference between the end V21 and an end V22. The LED parallel set 230 is coupled to one end of the resistor 220 through the end V12, and the other end of the resistor 220 is electrically connected to the ground GND. Referring to FIG. 1 and FIG. 2, for the LED series 130 and the LED parallel set 230, which include the same number of the LEDs, the numbers of the LEDs respectively included in the LED series 231 and 232 coupled in parallel in FIG. 2 are less than the number of the LEDs in the LED series 130 in FIG. 1. That is, the operating voltage $V_{\mathit{eff1}}$ of the LED series 130 in FIG. 1 is larger than the operating voltage $V_{\mathit{eff2}}$ of the LED parallel set 230 in FIG. 2. However, although the voltage stress of the LED parallel set 230 in FIG. 2 is reduced, and the safety issue is prevented, the equivalent resistors of the LED series 231 and 232 are mismatched, and further, the current passing through the LED series 231 and 232 is not equal, so that the brightness of the LED series 231 and 232 are not uniform.

SUMMARY OF THE INVENTION

Accordingly, a light emitting diode (LED) driving device capable of reducing voltage stress of the LED driving device and improving safety issue is provided.

An LED driving method capable of improving safety issue is provided.

An LED driving device including a voltage generator, a circuit and a compensation circuit is provided. Wherein, the voltage generator provides a positive voltage and a negative voltage. The circuit includes a load and an LED and is coupled between the positive voltage and the negative voltage. The compensation circuit senses voltages of two ends of the load, so as to generate a compensation signal, wherein the compensation signal is used to adjust the positive voltage or the negative voltage.

In an embodiment of the present invention, the above-described compensation circuit includes a comparing unit and a control unit. The comparing unit senses a voltage difference between the two ends of the load, so as to generate a feedback signal. The control unit is coupled to the comparing unit and the voltage generator and provides the compensation signal according to the feedback signal.

In an embodiment of the present invention, the above-described control unit includes a feedback signal end, a light adjusting signal end, and a logic element. Wherein, the feedback signal end is coupled to the comparing unit and used to receive the feedback signal. The light adjusting signal end is coupled to a pulse width modulating unit and receives a light adjusting signal. The logic element is used to generate the compensation signal capable of stabilizing the LED driving device according to the feedback signal and the light adjusting signal.

In an embodiment of the present invention, the above-described voltage generator includes a positive voltage circuit and a negative voltage circuit. The positive voltage circuit provides the positive voltage and adjusts the positive voltage according to the compensation signal. The negative voltage circuit generates the negative voltage according to the positive voltage. Furthermore, in an embodiment of the present invention, the negative voltage circuit provides the negative voltage and adjusts the negative voltage according to the compensation signal. The positive voltage circuit generates the positive voltage according to the negative voltage.

In an embodiment of the present invention, the above-described voltage generator includes a switch capable of adjusting the positive voltage according to the compensation signal. Wherein, the switch may be a metal-oxide-semiconductor (MOS) transistor, and the voltage generator adjusts the positive voltage according to a duty-cycle of the MOS transistor adjusted by the compensation signal.

An LED driving method is provided. In the LED driving method, a positive voltage and a negative voltage are provided to a circuit to form a current path through the circuit. Further, voltages of two ends of a load are sensed in the current path, wherein the load is coupled in series in the circuit. Furthermore, a compensation signal is generated according to the voltages of the two ends of the load. In addition, the positive voltage or the negative voltage is adjusted according to the compensation signal.

In an embodiment of the present invention, the above-described compensation signal adjusts the positive voltage outputted from the above-described voltage generator according to a feedback signal and a light adjusting signal, and the negative voltage is adjusted through the positive voltage.

In view of the above, the positive voltage and the negative voltage provided by the voltage generator is used in an embodiment consistent with the present invention. Accordingly, voltage stress of the LED driving device is able to be reduced, and safety issue is also improved.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the conventional LED driving device, the LED series is driven by using the voltage difference between the DC voltage $V_x$ and the ground GND. However, when the number of the LEDs in the LED series increases, the DC voltage $V_x$ provided by the voltage generator increases therewith. As a result, not only the voltage stress increases, but also each of the elements in the device having high voltage withstand capability is required, so that the safety issue is generated.

Accordingly, in an LED driving device of an embodiment consistent with the present invention, a voltage generator is used to provide a positive voltage and a negative voltage, so that a current path is formed between the positive voltage and the negative voltage in the LED driving device. On the contrary, a current path is simply formed between the DC voltage $V_x$ and the ground GND in the conventional LED driving device. That is, when the numbers of the driven LEDs are the same, a relatively high positive voltage is required in the conventional LED driving device. In an embodiment consistent with the present invention, since the voltage generator provides not only the positive voltage but also the negative voltage, the positive voltage driving the LEDs is reduced in the LED driving device. That is, the voltage stress due to the positive voltage is reduced.

Moreover, the voltage generator providing the higher voltage level may be replaced by two voltage generators providing lower voltage levels respectively as the positive voltage and the negative voltage. In other words, elements having relatively low voltage withstand capability may be used, so that cost of the LED driving device is reduced. Descriptions of the present invention are given in following according to the exemplary embodiments illustrated with accompanied drawings. In the following paragraphs, elements having identical or similar functions and structures are assigned with the same reference numbers and terms for consistency.

First Embodiment

Figure 3A:
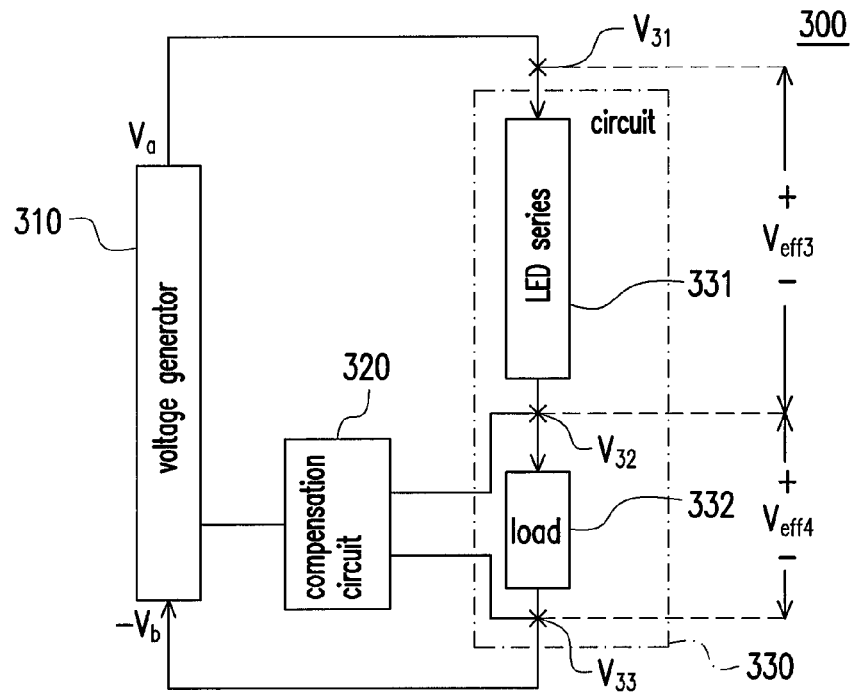
FIG. 3A shows an LED driving device according to an embodiment consistent with the present invention.

FIG. 3A shows an LED driving device according to an embodiment consistent with the present invention. The LED driving device 300 includes a voltage generator 310, a compensation circuit 320, and a circuit 330. The circuit 330 includes an LED series 331 and a load 332, wherein the LED series 331 is composed of a plurality of LEDs.

Furthermore, the voltage generator 310 is coupled to the circuit 330 through an end V31 to provide a positive voltage which is used to express a voltage larger than zero. The voltage generator 310 is coupled to the circuit 330 through an end V33 to provide a negative voltage which is used to express a voltage smaller than zero. Accordingly, a current loop is formed. In the circuit 330, the LED series 331 and the load 332 are coupled to each other. Herein, a voltage difference between the end V31 and the end V33 is divided into a voltage difference expressed as an operating voltage $V_{eff3}$ between the end V31 and an end V32 and a voltage difference expressed as an operating voltage $V_{eff4}$ between the end V32 and the end V33. Moreover, the compensation circuit 320 is coupled between the voltage generator 310 and the load 332 to sense the operating voltage $V_{eff4}$.

In the LED driving device 300, the voltage generator 310 is coupled to two ends of the circuit 330 and provides the positive voltage and the negative voltage, so that a voltage difference of the two ends of the circuit 330 is formed due to the positive voltage and the negative voltage. Herein, the circuit 330 includes the LED series 331 and the load 332, and the LED series 331 and the load 332 are coupled to each other in the circuit 330. The LED series 331 serves as a light source. Since the load 332 is coupled to the LED series 331 in series, the voltage difference provided by the voltage generator 310 is distributed among the LED series 331 and the load 332 according to Kirchhoff's voltage law (KVL). Accordingly, the voltage variation of the LED series 331 is reduced, so that the current of the circuit 330 is stabilized.

The compensation circuit 320 generates a compensation signal according to the voltage difference of the two ends of the load 332 sensed thereby, and further, the compensation signal is fed back to the voltage generator 310 so as to adjust the positive voltage or the negative voltage. A detail is further illustrated in following with respect to a flow chart.

Figure 4:
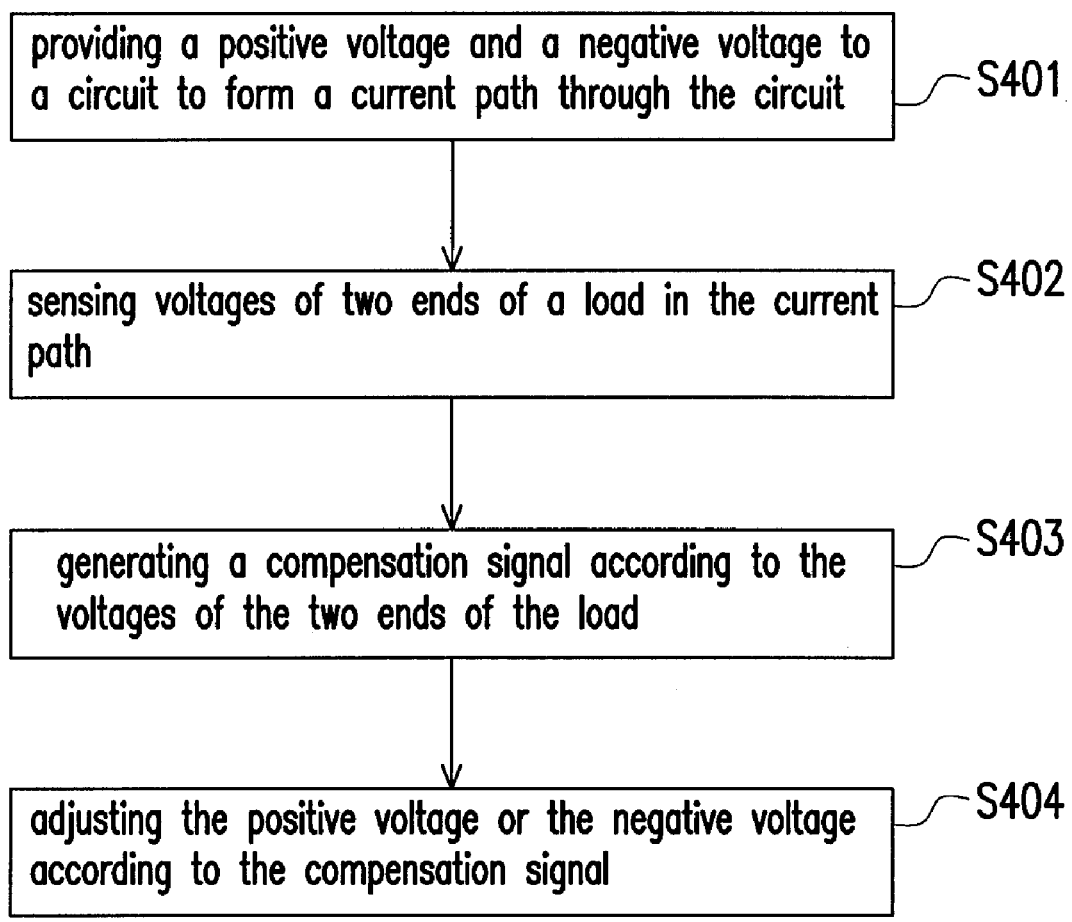
FIG. 4 is a flow chart showing an LED driving method according to an embodiment consistent with the present invention.

FIG. 4 is a flow chart showing an LED driving method according to an embodiment consistent with the present invention. In step S401, a voltage difference between the positive voltage and the negative voltage outputted by the voltage generator 310 is used to provide the operating voltage $V_{eff3}$ of the LED series 331 and the operating voltage $V_{eff4}$ of the load 332. That is, the summation of the operating voltage $V_{eff3}$ of the LED series 331 and the operating voltage $V_{eff4}$ of the load 332 is equal to the voltage difference between the positive voltage and the negative voltage outputted by the voltage generator 310. According to KVL, the ratio of the operating voltage $V_{eff3}$ and the operating voltage $V_{eff4}$ is changed by adjusting the impedance of the load 332. In the present embodiment, by changing the operating voltage $V_{eff4}$, the current provided by the voltage generator 310 is also changed in the meantime.

It should be noted that, those skilled in the art of the present invention should know the method used to adjust the impedance of the load 332 may be modified according to the actual requirements. Hence, the present invention is not limited thereto.

Returning to step S401, the current outputted by the voltage generator 310 flows from the positive voltage to the negative voltage. Herein, the current outputted from the voltage generator 310 passes through the circuit 330 and returns to the voltage generator 310 later. The path of the current through the circuit 330 passes through the LED series 331 and the load 332. The compensation circuit 320 is coupled to the two ends of the load 332 and used to sense the operating voltage $V_{eff4}$ in step S402.

In step S402, by coupling the compensation circuit 320 to the two ends of the load 332, the voltage difference of the end V32 and the end V33 is obtained, so that the desired operating voltage $V_{eff4}$ is sensed. Herein, those skilled in the art of the present invention should know that the compensation circuit 320 sensing the voltages of the two ends of the load 332 may be used to obtain the voltage difference or execute other operations, and the main spirit of the embodiment consistent with the present invention is that the compensation circuit 320 feeds the compensation signal back to the voltage generator 310 so as to adjust the positive voltage or the negative voltage outputted by the voltage generator 310. Hence, the present invention is not limited thereto.

Next, in step S403, the compensation circuit 320 generates a compensation signal according to the operating voltage $V_{eff4}$. The compensation signal is used to adjust the brightness of the LED series 331. In other words, when the brightness is adjusted, the adjustment of the outputted positive voltage and the outputted negative voltage is required to adjust the current passing through the LED series 331 in the meantime.

Specifically, in step S403, the compensation signal is outputted from the compensation circuit 320 to the voltage generator 310. Thereafter, in step S404, the compensation signal is used to adjust the positive voltage outputted by the voltage generator 310, so as to further adjust the voltage difference between the positive voltage and the negative voltage outputted by the voltage generator 310. That is, the compensation signal is used to adjust the summation of the operating voltage $V_{eff3}$ of the LED series 331 and the operating voltage $V_{eff4}$ of the load 332, so as to indirectly adjust the operating voltage $V_{eff4}$ of the load 332. In other words, the current outputted by the voltage generator 310 is also adjusted along with the adjusted voltage difference between the positive voltage and the negative voltage.

Figure 1:
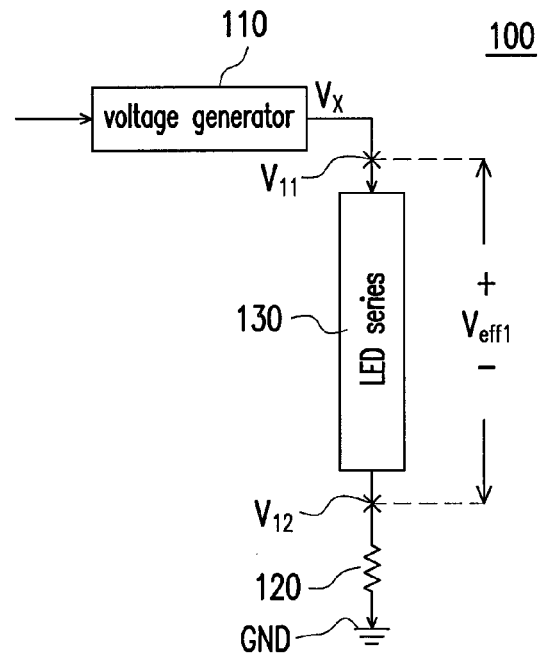
FIG. 1 is a conventional LED driving device.

Referring to FIG. 1 and FIG. 3A, when the voltage difference of the two ends of the resistor 120 in FIG. 1 is equal to the operating voltage $V_{eff4}$ of the two ends of the load 332, the operating voltage $V_{eff1}$ of the LED series 130 is equal to the operating voltage $V_{eff3}$ of the LED series 331. Meanwhile, the voltage difference of the end V11 and the ground GND is equal to the voltage difference of the ends V31 and V33. In other words, the voltage generator 110 in FIG. 1 outputs the DC voltage $V_x$, and the voltage difference of the DC voltage $V_x$ and the ground GND is equal to the voltage difference of the ends V31 and V33 outputted by the voltage generator 310 in FIG. 3.

For example, if the DC voltage outputted by the voltage generator 110 in FIG. 1 is expressed as $V_x$, the voltage difference of the DC voltage $V_x$ and the ground GND is also expressed as $V_x$. Furthermore, if the positive voltage and the negative voltage outputted by the voltage generator 310 in FIG. 3 are respectively expressed as $V_a$ and $V_b$ which are both larger than zero, since $V_x$ is equal to the difference of $V_a$ and $-V_b$, i.e. the summation of $V_a$ and $V_b$, $V_a$ is smaller than $V_x$. It means that when the voltage generator 310 outputs not only the positive voltage but also the negative voltage, the maximum voltage is reduced. Furthermore, in the LED driving device 300, elements having lower voltage withstand capability may be used, so that the safety issue is prevented. It should be noted that, when $V_a$ is equal to $V_b$, and $V_x$ is equal to the summation of $V_a$ and $V_b$, $V_a$ is a half of $V_x$.

Figure 2:
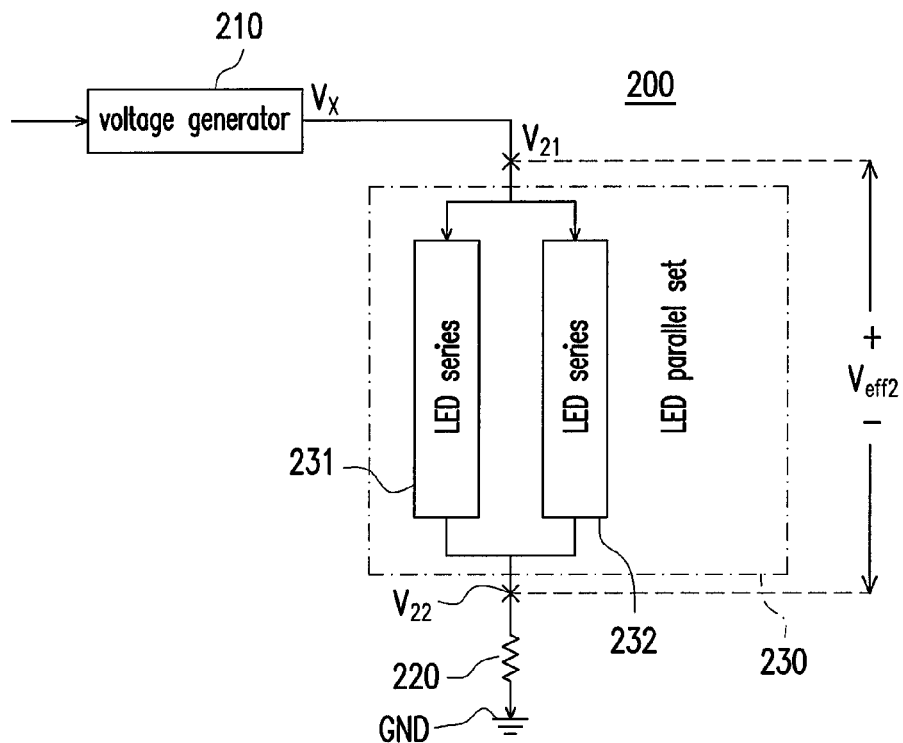
FIG. 2 is another conventional LED driving device.

In the related art, when the same brightness respectively emitted by the LEDs driven by the LED driving devices is required, although the LED parallel set 230 in FIG. 2 is used, the brightness of the LED series 231 and 232 are not uniform. As known from the above, in the present embodiment, the voltage stress and the maximum voltage are further reduced, and the brightness of the LED series 331 is uniform.

Second Embodiment

FIG. 3A shows an LED driving device according to an embodiment consistent with the present invention. Referring to FIG. 3A, in step S404 of the first embodiment, the compensation signal is used to adjust the positive voltage outputted by the voltage generator 310, but the present invention is not limited to this. In other embodiments, the compensation signal may be used to adjust the negative voltage outputted by the voltage generator 310.

Specifically, in the second embodiment, the compensation signal is used to adjust the negative voltage outputted by the voltage generator 310, so as to further adjust the voltage difference between the positive voltage and the negative voltage outputted by the voltage generator 3310. In other words, the compensation signal is used to adjust the summation of the operating voltage $V_{eff3}$ of the LED series 3331 and the operating voltage $V_{eff4}$ of the load 332. That is, the compensation signal indirectly adjusts the operating voltage $V_{eff3}$ of the LED series 331.

Details of the LED driving device 300 have been described in the above-described embodiment and therefore not repeated hereinafter.

Third Embodiment

The LED driving device of the third embodiment is similar to the LED driving device of the first embodiment except for the voltage generator, the pulse width modulation unit, and the compensation circuit.

Figure 3B:
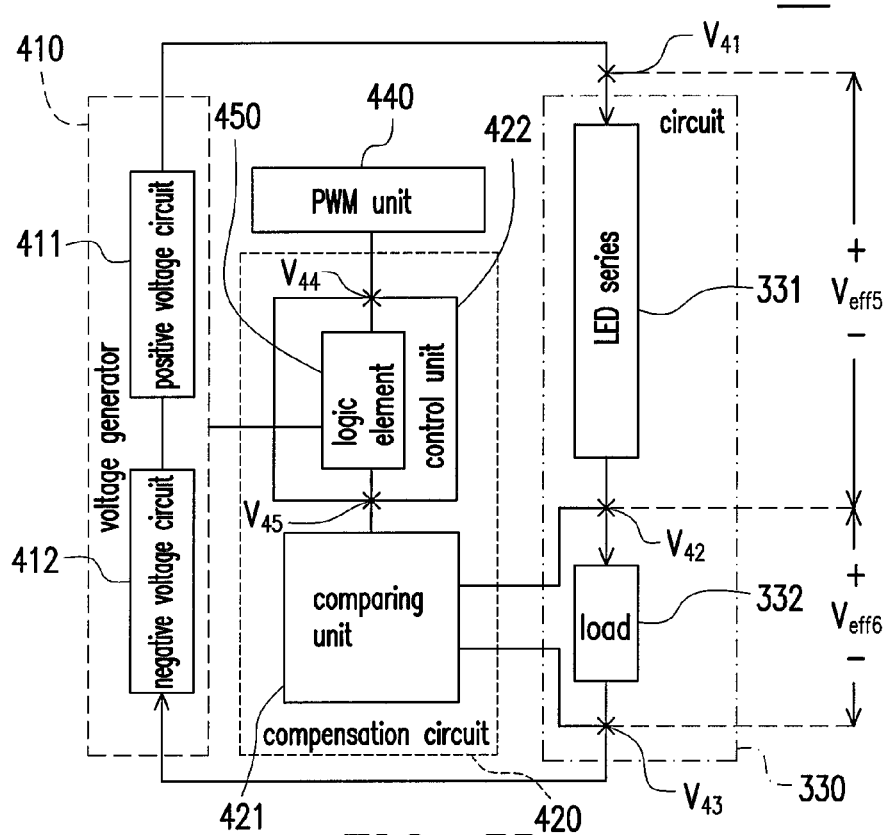
FIG. 3B shows an LED driving device according to another embodiment consistent with the present invention.

Specifically, FIG. 3B shows an LED driving device according to another embodiment consistent with the present invention. Referring to FIG. 3B, in the present embodiment, the LED driving device 400 includes a voltage generator 410, a comparing unit 421, a control unit 422, the circuit 330, and a pulse width modulation (PWM) unit 440, wherein the circuit 330 includes the LED series 331 and the load 332, and the LED series 331 is composed of a plurality of LEDs.

Accordingly, the voltage generator 410 includes a positive voltage circuit 411 and a negative voltage circuit 412. The positive voltage circuit 411 is coupled to the circuit 330 through an end V41 to provide the positive voltage, and the negative voltage circuit 412 is coupled to the circuit 330 through an end V43 to provide the negative voltage. Each of the positive voltage circuit 411 and the negative voltage circuit 412 is a DC power converter, such as a boost converter, a buck converter, a flyback converter, and a forward converter.

Herein, the DC power converter included in the embodiment consistent with the present invention provides a DC voltage to the LED series, so that the LED series emits light. Those skilled in the art may replace the DC power converter by other DC power converters without departing from the scope or spirit of the invention.

Moreover, in the circuit 330, the LED series 331 and the load 332 are coupled to each other. Herein, a voltage difference between the end V41 and the end V43 is divided into a voltage difference expressed as an operating voltage $V_{eff5}$ between the end V41 and an end V42 and a voltage difference expressed as an operating voltage $V_{eff6}$ between the end V42 and the end V43.

The compensation circuit 420 includes a comparing unit 421 and a control unit 422, wherein the control unit 422 includes a logic element 450 coupled to the control unit 422 and is coupled to the voltage generator 410.

The control unit 422 has a feedback signal end V45 and a light adjusting signal end V44 respectively coupled to the comparing unit 421 and the PWM unit 440. On the other hand, the comparing unit 421 is coupled to the two ends of the load 332 and senses the operating voltage $V_{eff6}$, so as to output a feedback signal to the feedback signal end V45. The PWM unit 440 senses the brightness of the LED series 331, so as to output a light adjusting signal to the light adjusting signal end V44. As a result, the logic element 450 adjusts the compensation signal according to the feedback signal and the light adjusting signal.

Accordingly, the compensation signal is outputted to the voltage generator 410 by the control unit 422, so as to adjust the positive voltage outputted by the voltage generator 410. A detail is further illustrated in following with respect to a flow chart.

FIG. 4 is a flow chart showing an LED driving method according to an embodiment consistent with the present invention. Referring to FIG. 4, in step S401, the voltage generator 410 includes the positive voltage circuit 411 and the negative voltage circuit 412. The positive voltage circuit 411 provides the positive voltage, and the negative voltage circuit 412 provides the negative voltage. Herein, a voltage difference exits between the positive voltage and the negative voltage and is used to provide the operating voltage $V_{eff5}$ of the LED series 331 and the operating voltage $V_{eff6}$ of the load 332.

That is, the summation of the operating voltage $V_{eff5}$ of the LED series 331 and the operating voltage $V_{eff6}$ of the load 332 is equal to the voltage difference between the positive voltage outputted by the positive voltage circuit 411 and the negative voltage outputted by the negative voltage circuit 412. According to KVL, the ratio of the operating voltage $V_{eff5}$ and the operating voltage $V_{eff6}$ is changed by adjusting the impedance of the load 332. In the present embodiment, by changing the operating voltage $V_{eff6}$, the current provided by the voltage generator 410 is also changed in the meantime.

Returning to step S401, the current outputted from the positive voltage circuit 411 flows through the circuit 330 to the negative voltage circuit 412. The path of the current through the circuit 330 passes through the LED series 331 and the load 332. The compensation circuit 420 is coupled to the two ends of the load 332 and used to sense the operating voltage $V_{eff6}$ in step S402.

Specifically, in the present embodiment, the compensation circuit 420 includes the comparing unit 421 and the control unit 422. In step S402, the comparing unit 421 is used to sense the voltage difference the end V42 and the end V43 and outputs the feedback signal to the feedback signal end V45, so that the control unit 422 receives the feedback signal.

Next, in step S403, the control unit 422 in the compensation circuit 420 outputs a light adjusting signal and the above-described feedback signal to the light adjusting signal end V44 according to the PWM unit 440. As a result, the logic element 450 adjusts the compensation signal according to the feedback signal and the light adjusting signal.

The compensation signal is outputted to the voltage generator 410 by the control unit 422. In step S404, the compensation signal outputted by the control unit 422 is used to adjust the positive voltage outputted by the voltage generator 410.

Furthermore, in step S404, the compensation signal is used to adjust a metal-oxide-semiconductor (MOS) transistor included in the voltage generator 410, wherein the MOS transistor is grounded through a short current path coupled thereto. By controlling the duty-cycle of the short current path coupled to the MOS transistor, the positive voltage is converted to a pulse voltage, so as to adjust the brightness of the LED series 331.

In step S404, the negative voltage circuit 412 generates a negative voltage according to the pulse voltage converted from the positive voltage. Details of the LED driving device 400 have been described in the above-described embodiment and therefore not repeated hereinafter.

Fourth Exemplary Embodiment

The fourth embodiment is similar to the third embodiment except for the voltage generator 410 and step S404.

Specifically, FIG. 3B shows an LED driving device according to an embodiment consistent with the present invention. In the present embodiment, in step S404, the compensation signal is used to adjust a metal-oxide-semiconductor (MOS) transistor included in the voltage generator 410, wherein the MOS transistor is grounded through a short current path coupled thereto. By controlling the duty-cycle of the short current path coupled to the MOS transistor, the negative voltage is converted to a pulse voltage, so as to adjust the brightness of the LED series 331.

In step S404, the positive voltage circuit 411 generates a positive voltage according to the pulse voltage converted from the negative voltage. Details of the LED driving device 400 have been described in the above-described embodiment and therefore not repeated hereinafter.

To sum up, the maximum voltage required by the LED driving device is reduced in an embodiment consistent with the present invention when the voltage generator outputs the positive voltage and the negative voltage in the meantime. Therefore, the voltage stress in an embodiment consistent with the present invention is relatively small. In addition, the embodiment of the present invention has at least the following advantages:

1. A high voltage generator is replaced with two low voltage generators, wherein one of the two low voltage generators outputs the positive voltage, and the other one of the two low voltage generators outputs the negative voltage, so that the voltage withstand capability of the elements in the LED driving device is reduced.

2. The elements having the relatively low voltage withstand capability are used, so that the cost of the LED driving device is reduced.

3. The safety issue is prevented since the maximum voltage of the LED driving device is reduced.

4. the LED driving device is adapted to reduce the maximum voltage of the LED series, so that it is solved that the brightness of the LED parallel set are not uniform.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A light emitting diode (LED) driving device, comprising:
   a voltage generator, for providing a positive voltage and a negative voltage; and
   a circuit, coupled between the positive voltage and the negative voltage, the circuit comprising:
   a load;
   an LED, coupled to the load in series; and
   a compensation circuit, for sensing voltages of two ends of the load, so as to generate a compensation signal, wherein the compensation signal adjusts the positive voltage or the negative voltage.

2. The LED driving device as claimed in claim 1, wherein the compensation circuit comprises:
   a comparing unit, for sensing a voltage difference between the two ends of the load, so as to generate a feedback signal; and
   a control unit, coupled to the comparing unit and the voltage generator, for providing the compensation signal according to the feedback signal.

3. The LED driving device as claimed in claim 2, wherein the control unit comprises:
   a feedback signal end, coupled to the comparing unit, for receiving the feedback signal;
   a light adjusting signal end, coupled to a pulse width modulating unit, for receiving a light adjusting signal; and
   a logic element, coupled to the control unit, for generating the compensation signal according to the feedback signal and the light adjusting signal.

4. The LED driving device as claimed in claim 1, wherein the compensation circuit senses a voltage difference between the two ends of the load, so as to generate a compensation signal, wherein the compensation signal adjusts the positive voltage or the negative voltage.

5. The LED driving device as claimed in claim 1, wherein the voltage generator comprises:
   a positive voltage circuit, for providing the positive voltage and adjusting the positive voltage according to the compensation signal; and
   a negative voltage circuit, for generating the negative voltage according to the positive voltage.

6. The LED driving device as claimed in claim 1, wherein the voltage generator comprises:
   a negative voltage circuit, for providing the negative voltage and adjusting the negative voltage according to the compensation signal; and
   a positive voltage circuit, for generating the positive voltage according to the negative voltage.

7. The LED driving device as claimed in claim 1, wherein the voltage generator comprises a metal-oxide-semiconductor (MOS) transistor and adjusts the positive voltage according to a duty-cycle of the MOS transistor adjusted by the compensation signal.

8. A light emitting diode (LED) driving method, comprising:
   providing a positive voltage and a negative voltage to a circuit to form a current path through the circuit;
   sensing voltages of two ends of a load in the current path, wherein the load is coupled in series in the circuit;
   generating a compensation signal according to the voltages of the two ends of the load; and
   adjusting the positive voltage or the negative voltage according to the compensation signal.

9. The LED driving method as claimed in claim 8, wherein the step of sensing the voltages of the two ends of the load in the current path comprises:
   sensing a voltage difference between the two ends of the load.

10. The LED driving method as claimed in claim 8, wherein the step of generating the compensation signal according to the voltages of the two ends of the load comprises:
    generating a feedback signal according to the voltages of the two ends of the serial load, wherein the compensation signal comprises the feedback signal and a light adjusting signal.

11. The LED driving method as claimed in claim 8, wherein in the step of adjusting the positive voltage or the negative voltage according to the compensation signal comprises:
    adjusting the positive voltage according to the compensation signal; and
    adjusting the negative voltage according to the positive voltage.

12. The LED driving method as claimed in claim 8, wherein in the step of adjusting the positive voltage or the negative voltage according to the compensation signal comprises:
    adjusting the compensation signal according to the negative voltage; and
    adjusting the positive voltage according to the negative voltage.

* * * * *